United States Patent
Dellea et al.

(10) Patent No.: US 9,636,704 B2
(45) Date of Patent: May 2, 2017

(54) METHOD FOR DEPOSITING A PARTICLE FILM ONTO A SUBSTRATE VIA A LIQUID CONVEYOR, INCLUDING A STEP OF STRUCTURING THE FILM ON THE SUBSTRATE

(71) Applicant: Commissariat a l'energie atomique et aux ene alt, Paris (FR)

(72) Inventors: Olivier Dellea, La Talaudiere (FR); Philippe Coronel, Barraux (FR); Simon Frederic Desage, Saint-Chamond (FR); Pascal Fugier, Bernin (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 457 days.

(21) Appl. No.: 14/375,532

(22) PCT Filed: Feb. 8, 2013

(86) PCT No.: PCT/EP2013/052511
§ 371 (c)(1),
(2) Date: Jul. 30, 2014

(87) PCT Pub. No.: WO2013/117680
PCT Pub. Date: Aug. 15, 2013

(65) Prior Publication Data
US 2015/0010693 A1 Jan. 8, 2015

(30) Foreign Application Priority Data
Feb. 10, 2012 (FR) .................................... 12 51256

(51) Int. Cl.
*B05D 1/20* (2006.01)
*B05D 1/36* (2006.01)
*B82Y 30/00* (2011.01)

(52) U.S. Cl.
CPC ................. *B05D 1/36* (2013.01); *B05D 1/20* (2013.01); *B05D 2252/02* (2013.01); *B05D 2401/32* (2013.01); *B82Y 30/00* (2013.01)

(58) Field of Classification Search
CPC ................................... B05D 1/36; B05D 1/20
See application file for complete search history.

(56) References Cited

U.S. PATENT DOCUMENTS

| 6,423,172 B1 | 7/2002 | McArdle et al. |
| 7,804,134 B2 | 9/2010 | Coronel et al. |
| (Continued) | | |

FOREIGN PATENT DOCUMENTS

| CN | 1 544 308 | 11/2004 |
| WO | 99 38623 | 8/1999 |
| (Continued) | | |

OTHER PUBLICATIONS

U.S. Appl. No. 14/232,092, filed Jan. 10, 2014, Savelli, et al.
(Continued)

*Primary Examiner* — Xiao Zhao
(74) *Attorney, Agent, or Firm* — Oblon, McClelland, Maier & Neustadt, L.L.P.

(57) ABSTRACT

A method for depositing particles onto a substrate, or a running substrate, including: (a) making a compact film of particles floating on a carrier liquid provided in a transfer area having an outlet of particles laid out facing the substrate; (b) depositing a substance on the compact film of particles, in the transfer area; (c) transferring, through the outlet of particles and onto the substrate, the compact film of particles coated with the substance; and then (d) removing the substance to carry away with the substance the particles of the film which adhere to the substance, to generate at least one recessed area within the film deposited on the substrate.

9 Claims, 4 Drawing Sheets

(56) References Cited

U.S. PATENT DOCUMENTS

| | | |
|---|---|---|
| 2005/0129867 A1* | 6/2005 | Picard ............... B01D 69/122 427/434.3 |
| 2005/0281944 A1 | 12/2005 | Jang |
| 2013/0052552 A1 | 2/2013 | Phan et al. |
| 2013/0330471 A1 | 12/2013 | Dellea et al. |
| 2014/0147583 A1 | 5/2014 | Dellea et al. |
| 2014/0158334 A1 | 6/2014 | Dellea et al. |

FOREIGN PATENT DOCUMENTS

| | | |
|---|---|---|
| WO | 01 89716 | 11/2001 |
| WO | 03 095108 | 11/2003 |

OTHER PUBLICATIONS

U.S. Appl. No. 14/369,752, filed Jun. 30, 2014, Dellea, et al.
U.S. Appl. No. 14/375,858, filed Jul. 31, 2014, Dellea, et al.
U.S. Appl. No. 14/375,994, filed Jul. 31, 2014, Dellea, et al.
Kinge et al., "Self-Assembling Nanoparticles at Surfaces and Interfaces", CHEMPHYSCEM, vol. 9, No. 1, pp. 20-42, (2008), XP055042089.
International Search Report Issued May 28, 2013 in PCT/EP13/052511 filed Feb. 8, 2013.
U.S. Appl. No. 14/398,340, filed Oct. 31, 2014, Savelli, et al.
U.S. Appl. No. 14/423,957, filed Feb. 25, 2015, Dellea, et al.

\* cited by examiner

METHOD FOR DEPOSITING A PARTICLE FILM ONTO A SUBSTRATE VIA A LIQUID CONVEYOR, INCLUDING A STEP OF STRUCTURING THE FILM ON THE SUBSTRATE

TECHNICAL FIELD the invention relates to the domain of methods for depositing particles onto a substrate, preferably a running substrate.

More specifically, it relates to the deposition of a film of ordered particles, preferably of the monolayer type, the particle size of which may be comprised between a few nanometers and several hundred micrometers. The particles, preferably of a spherical shape, may for example be particles of silica.

The invention essentially relates to a step for structuring the film of particles after it's deposition onto the substrate, this structuration for example aiming at integrating therein other particles, and/or objects. Another possibility consists of retaining recessed areas of particles, surrounded by the remainder of the ordered film deposited onto the substrate.

In the case of integrating objects into the deposited film, the question is in particular to manufacture devices with a hybrid nature, such as for example sensors. As an indication, a hybrid device associates by definition on a same substrate objects having diverse functions, for example electronic, optical, electro-optical, piezoelectric, thermoelectric, mechanical functions, etc.

The objects which may be integrated to the film of particles are for example:
  active electronic components, such as transistors, microprocessors, integrated circuits, etc.;
  passive electronic components, like resistors, capacitors, diodes, photodiodes, coils, conductive tracks, welding preforms, etc.;
  optical components, such as lenses, microlenses, diffraction gratings, filters, etc.;
  battery cells, micro-cells, micro-batteries, photodetectors, solar cells, RFID systems, etc.;
  nano- or micro-metric, active or passive particles or aggregates, for example of the type of oxides, polymers, metals, semiconductors, Janus particles (particles having two faces of different natures or properties), nanotubes, etc.

More particularly, the invention relates to the integration of objects for which the dimensions extend:
  for components: from a microscopic scale (a few tens of microns), to a macroscopic scale (more than about 10 centimeters); and
  for particles and aggregates: from 1 nanometer to several hundred microns.

More generally, the invention has applications in the fields of fuel cells, optics, photonics, polymer coating, chips, MEMs, of surface structuration for organic electronics and photovoltaics, etc.

STATE OF THE PRIOR ART

For depositing films of ordered particles, a technique for transferring a film of ordered particles onto a substrate has been recently developed, via a liquid conveyor. Nevertheless usual structuration techniques do not prove to be suitable when the question is to transfer of the film onto a substrate via a liquid conveyor.

Further, these usual techniques generally remain not very tolerant to manipulation errors.

SUMMARY OF THE INVENTION the object of the invention is therefore to at least partly find a remedy to the drawbacks mentioned above. To do this, the object of the invention is a method for depositing particles onto a substrate, preferably a running substrate, comprising the following steps:
  (a) producing a compact film of particles floating on a carrier liquid provided in a transfer area having an outlet of particles arranged facing said substrate;
  (b) depositing a substance onto said compact film of particles, in the transfer area;
  (c) transferring, through said outlet of particles and on said substrate, some compact film of particles coated with the substance; and then
  (d) removing the substance so as to carry away with it the particles of the film which adhere to it, in order to generate at least one recessed area within this film deposited on the substrate.

The invention thus provides a simple and effective solution allowing the structuring of a film of ordered particles after its third deposition onto the substrate, while using a liquid conveyor making this method tolerant to possible errors of manipulation and/or deposition of the substance. Indeed, in the case of an error, the latter may be easily corrected when the particles are still on the carrier liquid, before they are deposition onto the substrate.

More generally, the invention provides a great flexibility in its carrying out.

The structuration step for example aims at integrating therein different particles and/or objects, or quite simply at leaving empty the recessed areas of particles.

In this respect, it is indicated that the substance is deposited so as to define at least one pattern, for example a point or a cord, either closed or not. Depending on its diameter, the cord may even be assimilated with a line. They may alternatively be surface patterns, for example with the shape of a disk, quadrilateral or any other shape known to be suitable for then defining the desired recessed area.

Of course, different patterns may succeed each other on the film of particles, without departing from the scope of the invention.

Among the contemplated objects for being placed in the recessed areas, mention is made of silicon chips, microbatteries, components of organic electronics, metal elements, photovoltaic cells; battery cells and battery microcells. These objects notably give the possibility of manufacturing devices with a hybrid nature, such as for example sensors.

Moreover, when the question is to fill the recessed area by means of other particles, the latter are preferably different from both those of the film produced beforehand on the carrier liquid, for example with distinct composition and/or size. This notably allows formation of a film with gradients.

Preferably, said substance comprises a polymerizable compound, which is polymerized after it's deposition on the compact film of particles.

The use of such a polymerizable substance pros to be quite adapted to the context of transferring particles by a liquid conveyor. In particular, during its application, any polymerizable substance is capable of being adapted to the level differences between the particles of the film.

This substance, once it is polymerized, thus forms of one or several solid patterns which are then intended to be removed, with the particles which adhere to it.

Other types of substances ensuring a similar functions may be retained, without departing from the scope of the invention.

In the preferred case of a substance containing a polymerizable compound, polymerization is carried out with any technique known to be suitable by one skilled in the art, preferably a thermal or optical technique. It is complete or partial before step (c), or else initiated after this step. In every case, it is preferentially ensured that after polymerization, substantially all the particles in contact with the substance sufficiently adhere to the latter so that upon removing this substance, it carries away with it these same particles, by taking them off the substrate. Only certain particles located at the periphery of the patterns may possibly remain stuck on the substrate, without departing from the scope of the invention.

Removing the polymerized substance is preferably carried out by peeling, manually with suitable tools, or else in an automated way.

Preferably, upon transfer onto the substrate, the substance which adheres to the particles at its contact, whether it is polymerized or not, remains sufficiently flexible so as to support possible flexure upon passing from the transfer area to the substrate.

Depending on the encountered needs, the diameter of the obtained cords/spikes may be between a few tens of microns and several millimeters.

Preferably, said substance appears as a liquid or slurry.

Preferably, said substance has hydrophobicity, and preferably also in the polymerized solid state.

More generally, notably taking into account the cases when the carrier liquid is not water, it is noted that the substance proves to be non-miscible with the carrier liquid.

Preferably, said substance is based on silicone resin, epoxy resin and/or polyurethane resin.

Preferably, the ratio between the large dimension of the particles of the compact film, and that of the objects subsequently accommodated in the recessed areas of the film deposited on the substrate, is comprised between $10^4$ and $10^8$. As an example, the particles forming the compact film may have a large dimension of the order of 1 nm to 500 μm, while the objects, as for them, may have a large dimension ranging up to about 30 cm.

Preferably, the particles of the compact film are silica beads with a diameter of about 1 μm. it is nevertheless noted that the film may be heterogeneous, i.e. include beads of different sizes.

Preferably, each object has a large dimension greater than 0.2 cm, and preferably less than 30 cm. This latter value may be adapted according to the width of the deposited film. Indeed, the largest dimension of each object may attain a value close to the final width of this film. Objects with a micrometric or nanometric size may also be used, without departing from the scope of the invention.

The object subsequently integrated to the film, some examples of which have been mentioned earlier, may be of any shape, not necessarily planar, optionally having one or several radii of curvature, for example of less than 5 cm, or further integrating pads useful for connections. Also, for the particles of the film, the shapes may be varied but are preferably homogeneous.

By means of the invention, the focus is also on the manufacturing of complex devices such as for example sensors comprising detection elements (particles for example), one or several energy recovery systems (photovoltaic cell, piezoelectric film, fuel cell), an energy storage system (micro-battery), a system for managing information (silicon chip), a communications system (RFID chip), electric connecting elements (conductive tracks), electronic components (resistors, capacitors), welding elements (preforms). The objects required for obtaining these devices are then laid out accordingly on the deposited film, instead of and in place of the removed substance, these objects being superposed if need be.

Moreover it is noted that the compact film of particles, the concept of which is for example disclosed in the document Sachin Kinge, "Self-Assembling Nanoparticles at Surfaces and Interfaces", ChemPhysChem 2008, 9, 20-42, may be obtained at the surface of the carrier liquid by any technique known to one skilled in the art, for example by compression, and/or by dipole-dipole interaction and/or by magnetic field, etc.

The dipole-dipole interaction technique is applied for particles with facets, for example tetrahedral, cubic or further octahedral facets. With these shapes, the dipole-dipole interactions play an important role in the organization of the particles. The dipolar moments are generated inside these particles because of the polarity differences between the facets.

The magnetic field organization technique is used with magnetic nanoparticles which may be ordered by using an intense magnetic field, generating strong interactions between the particles.

The compression technique is notably known from the document Lucio Isa et al., "Particle Lithography from Colloidal Self-Assembly at Liquid Liquid Interfaces", ACSNANO, Vol. 4 ■ No. 10 ■ 5665-5670 ■ 2010, from the document Markus Retsch, <<Fabrication of Large-Area, Transferable Colloidal Monolayers Utilizing Self-Assembly at the Air/Water Interface", Macromol. Chem. Phys. 2009, 210, 230-241, or further from the document Maria Bardosova, <<The Langmuir-Blodgett Approach to Making Colloidal Photonic Crystals from Silica Spheres", Adv. Mater. 2010, 22, 3104-3124.

This compression technique also comprises the solution with a tilted ramp described in document CA 2,695,449. Thus, the method according to the invention is preferentially applied with a tilted ramp for circulation of the particles, attached to an inlet of the transfer area, and on which are said carrier liquid is also intended to circulate.

A portion of the energy required for ordering the particles under normal conditions is then here brought by the tilted ramp transporting the carrier liquid and the particles. Other solutions are nevertheless possible, like setting into motion by means of a pump, the carrier liquid on a horizontal plane, the downstream portion of which is the area for transferring the particles. Another solution consists of replacing the pump with a fan allowing an airflow to be applied to the surface of the carrier liquid, on which float the particles to be transferred. As mentioned above, other solutions may nevertheless be contemplated, without departing from the scope of the invention, like compressional work of particles via a so-called <<Langmuir-Blodgett>> technique.

Finally, after transfer onto the substrate, the method preferably integrates a thermal annealing step for facilitating deposition and adherence of these particles on the substrate.

Other advantages and features of the invention will become apparent in the non-limiting detailed description below.

BRIEF DESCRIPTION OF THE DRAWINGS

This description will be made with reference to the appended drawings wherein.

DETAILED DESCRIPTION OF PREFERRED EMBODIMENTS

Figure 1:
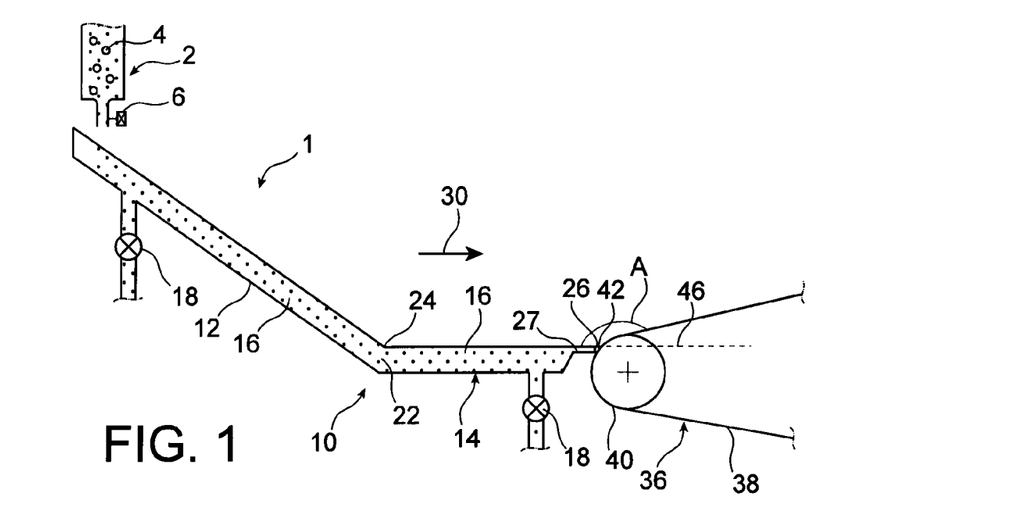
FIG. 1 shows a deposition facility according to a preferred embodiment of the present invention, in a sectional view taken along the line I-I of FIG. 2.
Figure 2:
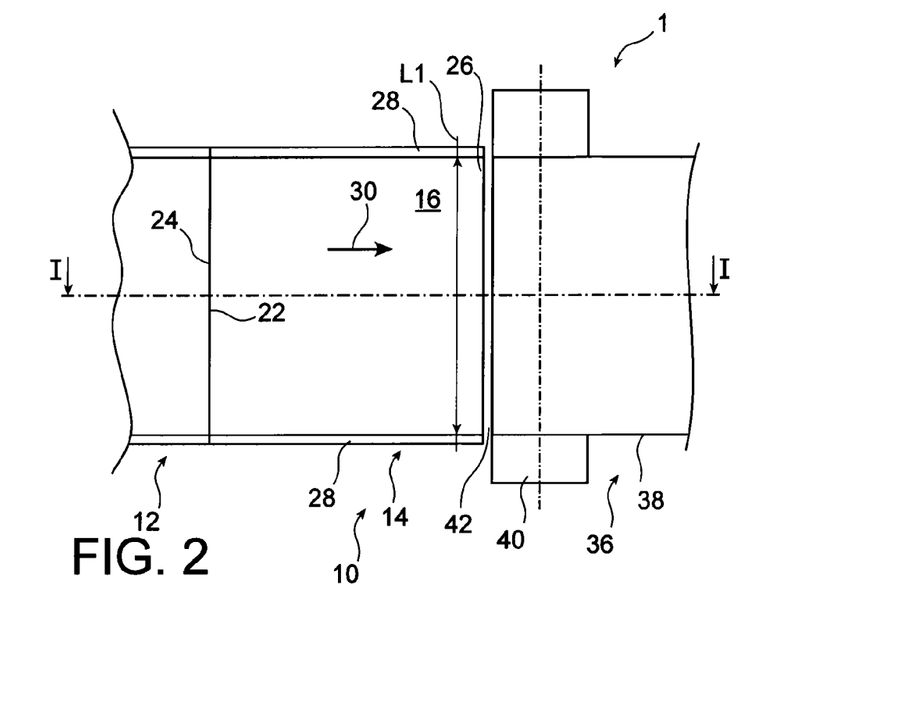
FIG. 2 illustrates a schematic top view of the deposition facility shown in FIG. 1.

First of all with reference to FIGS. 1 and 2, a facility 1 for transferring particles onto a substrate, preferably a running substrate may be seen. This transfer, which may be assimilated to a deposition, is carried out by forming a compact film of particles on a carrier liquid, a film which is then deposited on the substrate before being structured depending on the encountered needs, as this will be detailed hereafter.

The facility 1 includes a device 2 for dispensing particles 4, the size of which may be comprised between a few nanometers and several hundred micrometers. The particles, preferably with a spherical shape, may for example be silica particles. Other particles of interest may be made in metal or metal oxide, such as platinum, $TiO_2$, in polymer like polystyrene or PMMA, in carbon, etc.

More specifically, in the preferred embodiment, the particles are silica spheres with a diameter of about 1 μm, stored in solution in the dispensing device 2. The proportion of the medium is about 7 g of particles for 200 ml of solution, here butanol. Naturally, for the sake of clarity, the particles illustrated in the figures adopt a diameter greater than their real diameter.

The dispensing device 2 has a controllable injection nozzle 6 with a diameter of about 500 μm.

The facility also includes a liquid conveyor 10, integrating a tilted ramp 12 for circulation of the particles, and a substantially horizontal transfer area 14 or even having a slight tilt so as to promote certain emptying of the facility, if necessary. The high end of the tilted ramp is provided for receiving the particles injected from the dispensing device 2. This ramp is straight, tilted by an angle comprised between 5 and 60°, preferably between 10 and 30°, allowing the particles to be transported towards the transfer area 14. Further a carrier liquid 16 circulates on this ramp 12, as far as in the transfer area. This liquid 16 may moreover be re-circulated by means of one or two pumps 18, between the transfer area 14 and the high end of the ramp. This is here preferably deionized water, on which the particles 4 may float. Nevertheless, a new liquid may be preferred via an open circulation circuit. This may also be an association of several non-miscible liquids.

The low end of this same ram pis connected to an inlet of the particle transfer area 14. This inlet 22 is located at an inflection line 24 materializing the junction between the surface of the carrier liquid present on the tilted plane of the ramp 12, and the surface of the carrier liquid present on the horizontal portion of the transfer area 14.

The inlet of particles 22 is spaced apart from an outlet of particles 26 by means of two side edges 28 retaining the carrier liquid 16 in the area 14. These edges 28, facing each other and at a distance from each other, extend parallel to a main direction of flow of the carrier liquid and of the particles in the facility, this direction being schematized by the arrow 30 in FIGS. 1 and 2. The area 14 therefore assumes the shape of a corridor or of a path open at its inlet and at its outlet, even if other geometries might be adopted, without departing from the scope of the invention.

The bottom of the downstream portion of the transfer area has a plateau 27 slightly tilted upstream relatively to the horizontal direction, for example by a value of the order of 5 to 10°. It is the downstream end of this same plateau 27, also called <<blade>>, which partly defines the outlet of the particles 26.

The facility 1 is also provided with a substrate conveyor 36, in order to have the substrate 38 running. This substrate may be stiff or flexible. In the latter case, it may be set into motion on a roller 40 for which the axis is parallel to the outlet 26 of the area 14, in proximity to which it is located. Indeed, the substrate 38 is intended to run very closely to the outlet 26, so that the particles reaching this outlet may easily be transferred on this substrate, via a capillary bridge 42, also called a meniscus, which connects it to the carrier liquid 16. Alternatively, the substrate may be directly in contact with the transfer area, without departing from the scope of the invention. The capillary bridge mentioned above is then no longer required.

In the example shown in the figures, the width of the substrate corresponds to the width of the area 14 and of its outlet 26. This is a width L1 which also corresponds to the maximum width of the film of particles which may be deposited onto the substrate. This width may be of the order of 25 to 30 cm. the width of the substrate on which the particles should be deposited may however be smaller than the width L1.

The capillary bridge 42 is provided between the carrier liquid 16 which is located at the outlet 26, and a portion of the substrate 38 fitting of the guiding/driving roller 40.

Preferably, the protruding angle A, form between the horizontal direction 46 and the portion of the substrate 38 on which the film of particles and the objects should be deposited, is greater than 160°, and even more preferentially close to 180°, for example of the order of 175°.

A method for depositing particles according to an embodiment will now be described with reference to FIGS. 3 to 9.

First of all, the injection nozzle 6 is activated in order to begin with the dispensing of the particles 4 on the ramp 12. The question is to apply an initial step for filling the transfer area 14, with the particles 4, with the carrier liquid 16 already at the required level in the area 14.

Figure 3:
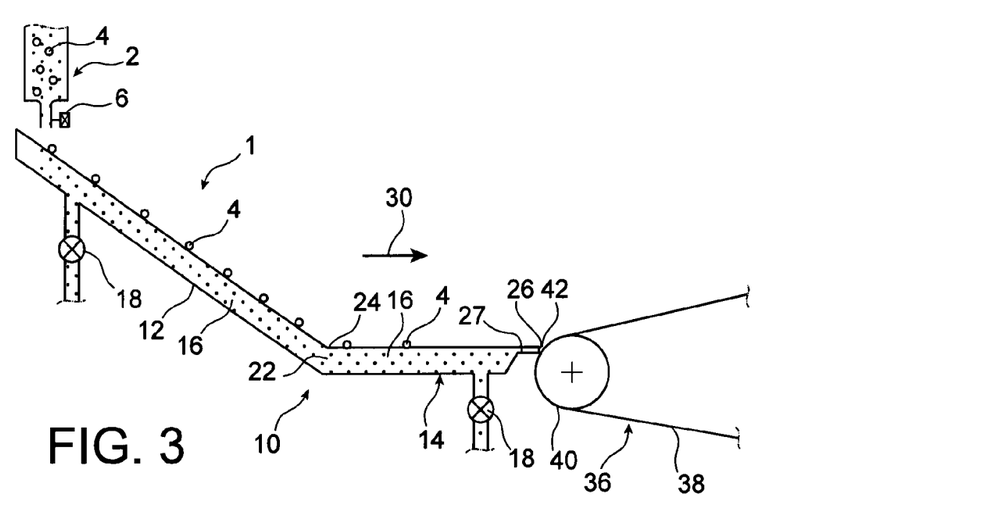
FIGS. 3 to 9 illustrate different steps of a deposition method applied by means of the facility shown in the previous figures, according to a preferred embodiment.
Figure 4:
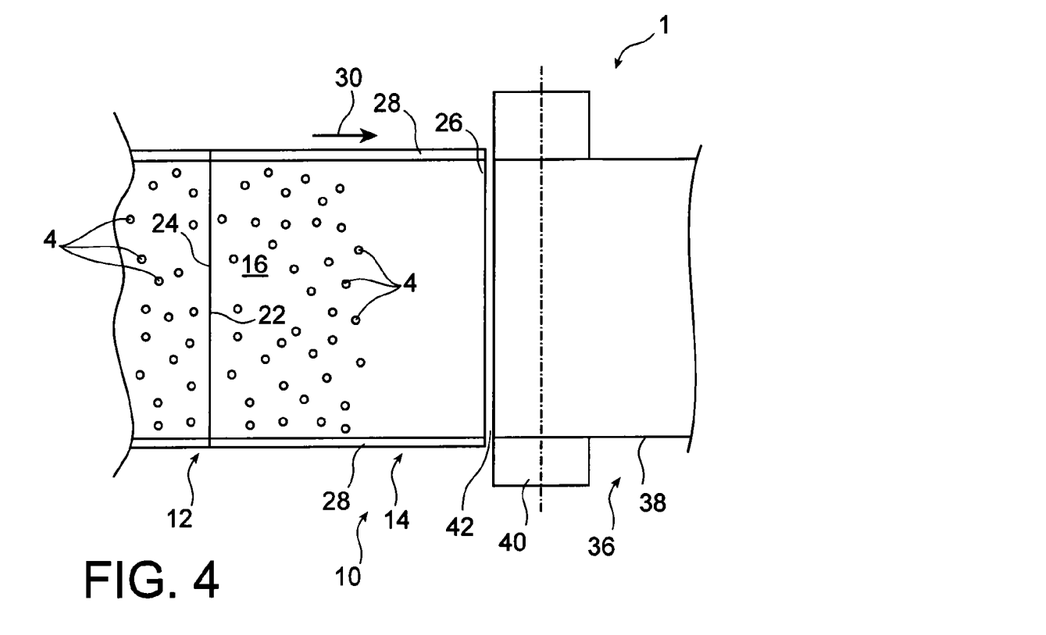

During of this initiation phase, the particles dispensed by the device 2 circulate on the ramp 12, and then penetrate into the area 14 in which they are dispersed, as this was schematized in FIGS. 3 and 4.

As the particles 4 are gradually injected on the ramp 12 and penetrate into the transfer area 14, they will abut against the substrate 38, and then the upstream front of these particles tends to shift upstream, towards the inflection line 24. The injection of particles is continued even after the upstream front has past the line 24, so that it moves back onto the tilted ramp 12.

Figure 5:
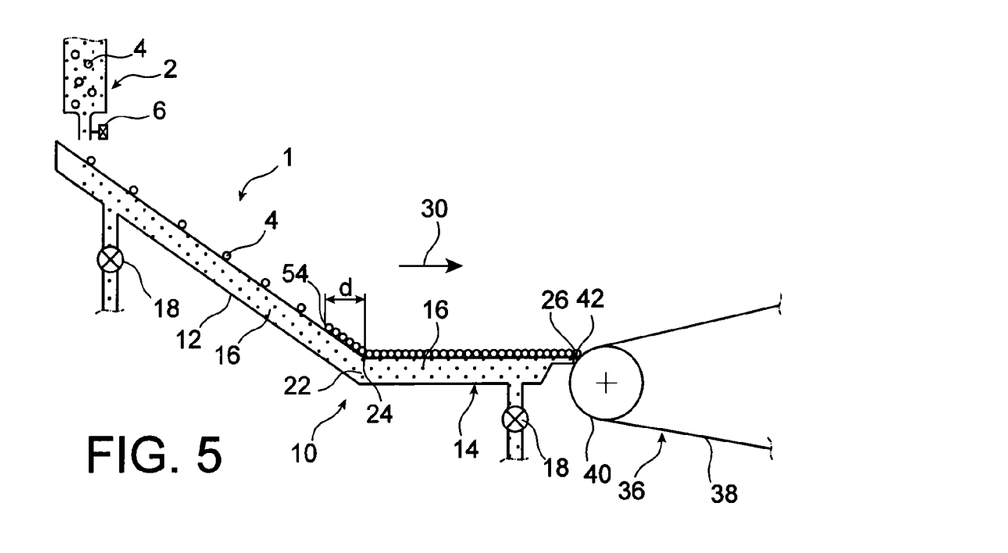

Actually, it is ensured that the upstream front of particles 54 moves back up onto the ramp 12 so that it is located at a given horizontal distance <<d>> from the inflection line 24, as shown in FIG. 5. The distance <<d>> may be of the order of 30 mm.

At this instant, the particles 4 are ordered in the transfer area and on the ramp 12, on which they are automatically ordered, without any assistance, notably by means of their kinetic energy and the capillary forces they utilized at the moment of the impact on the front 54. The ordering is such that the obtained compact film has a so-called <<hexagonal compact>> structure, in which each particle 4 is surrounded and contacted by six other particles 4 in contact with each other. This is then equally referred to as a compact film of particles or a film of ordered particles.

Once the ordered particles 4 forming the film cover the entirety of the carrier liquid located in the transfer area 14, it is proceeded with a step for making patterns 70 on the film 4, by depositing a substance 72 on the particles.

Here, each pattern 70 assumes the shape of a cord along a closed line, but may alternatively assume any other shape known to be suitable according to the encountered needs, as a point-like shape or a surface shape.

Figure 6:
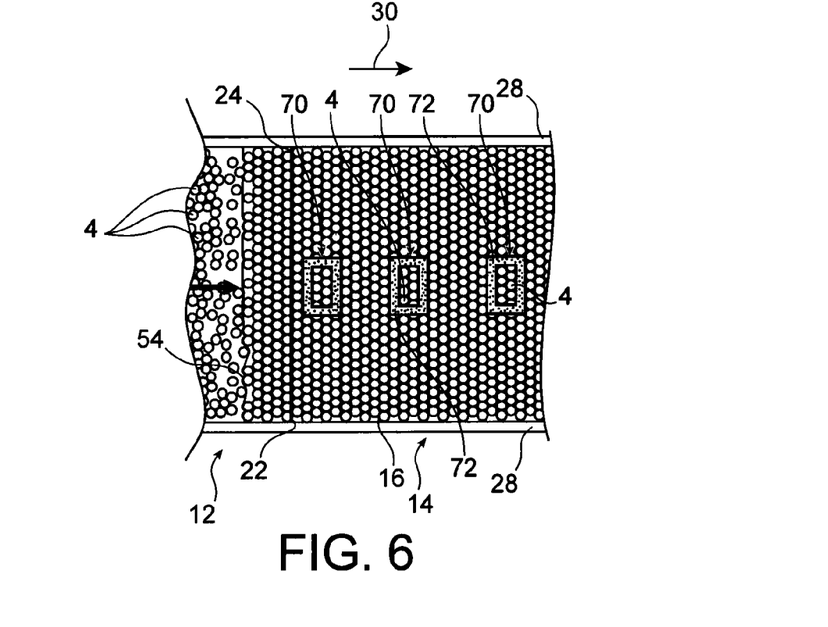

FIG. 6 shows an example of several patterns defined by means of the deposited substance 72, giving the possibility of holding the particles wetted by this substance 72, relatively to each other, which here is preferably of the type comprising a polymerizable compound. Of course, the particles 4 located interiorly and exteriorly a relatively to the cord-shaped contours 72 remain ordered.

Deposition of the polymerizable substance is for example carried out by means of a dispensing nozzle (not shown). Upon arriving in contact with the particles, the substance 72 is capable of adapting to the topography of the ordered film, and adheres to the particles 4 which its covers.

The polymerizable compound is for example a silicone resin, an epoxy resin, and/or a polyurethane resin. Polymerization is carried out in a standard way, for example via a thermal and/or optical route, and preferably is at least partly carried out when the substance is still in the transfer area, not deposited as yet onto the substrate.

The substance 72 then appears as a liquid or slurry, to which particles may possibly be added before its dispensing.

Moreover, it is indicated that the substance is retained so that it allows some flexibility of the cord upon transfer onto the substrate, in order to support flexure upon passing from the transfer area to the substrate, and this because of the tilt A of the substrate relatively to the horizontal direction. This flexibility should therefore subsist after partial or total polymerization of the cord in the transfer area, before transfer onto the substrate.

Preferably, the substance 72 has hydrophobicity in the liquid state, so that the latter remains at the surface of the carrier liquid after its dispensing onto the film of particles 4, if the substance reaches this same surface of the carrier liquid. Whatever the case, the substance 72, after it's certain deposition on the film, adheres to the latter because of its composition. After polymerization, the adherence of the particles to the substance is reinforced. Further, the substance is also selected so as to remain insoluble in the carrier liquid in the liquid state, and also in the solid state after polymerization.

Polymerization is therefore carried out preferentially before transfer onto the substrate, in order to obtain flexible cords, with a diameter preferably comprised between a few tens of microns and several millimeters, maintaining together the particles 4 which are in contact with it and also maintaining the initial shape of the patterns.

The following step of the process consists of triggering the movement of the substrate 38, initiated as soon as the front 54 has attained the required level illustrated in FIG. 5, and after deposition of the substance 72. The film of ordered particles 4, coated with the patterns 70, is then deposited onto the substrate 38 by displacement through the outlet 26, by following the capillary bridge 42, in the way described in document CA 2,695,449. In other words, the displacement of the film 4 allows the patterns 70 to be conveyed.

Figure 7:
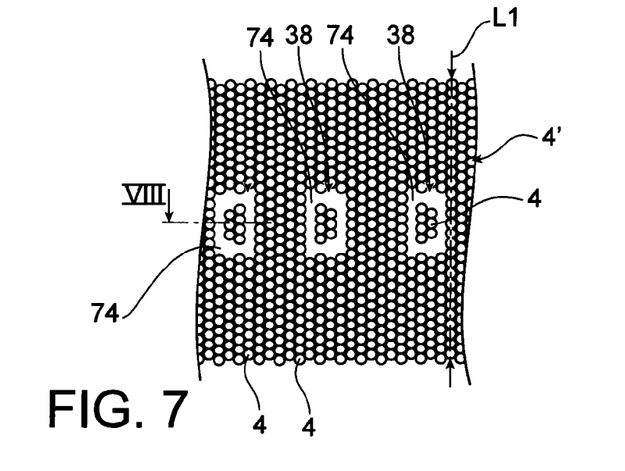

As mentioned above, after deposition, the width of the structured film 4' shown in FIG. 7 corresponds to the width L1 of the outlet 26, even if a smaller width may be adopted, without departing from the scope of the invention.

Still more preferably, the substrate is directly in contact with the outlet of the particles.

It is noted that before deposition on the substrate, the ordered particles 4 cover the whole surface of the carrier liquid 16 present in the transfer area. The ordering of the particles is thus preserved up to the deposition moment at the outlet 26 of the area 14. Preserving this ordering ensures that an accurate relative positioning is maintained between the patterns 72, as well as an accurate position relatively to the fixed side edges 28, until the structured film 4' is deposited onto the substrate.

In order to facilitate deposition and adherence of the particles 4 on the substrate 38, preferably made in polymer, thermal annealing is provided after the transfer. This thermal annealing is for example carried out at 80° C., by using a low temperature rolling mat film based on polyester, for example marketed under the reference of PERFEX-MATT™, with a thickness of 125 μm.

The advantage of such a film as a substrate is that one of its faces becomes tacky at a temperature of the order of 80° C., which allows it to facilitate adherence of the particles 4 on the latter.

More specifically, at this temperature, the particles 4 sink into the softened film 38, and thus allow direct contact of the objects with the film which leads to their adhesion.

Alternatively, the substrate 38 may be of the silicon, glass or further piezoelectric film type.

During the transfer, the injection of particles and the running speed of the substrate are adjusted so that the front of particles remains in a substantially identical position. To do this, the particle flow rate should be of the order of 0.1 ml/min to several ml/min, while the linear speed of the substrate 38, also designated as a drawing rate, maybe of the order of a few mm/min to several hundred mm/min. As mentioned above, the supply of particles 4 may be temporarily stopped during the making of the patterns 70, or else maintained.

Figure 8:
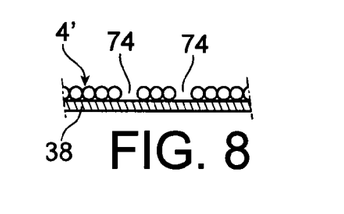

The following step, schematized in FIGS. 7 and 8, consists of removing the substance 72 by peeling so as to carry away with it the particles 4 of the film which adhere to it. During this withdrawal, the removal of the relevant particles shows recessed areas 74 within the film 4' deposited on the substrate. The recessed areas 74 then adopt a geometry either identical with or similar to that of the removed patterns 70, achieves beforehand by means of the substance 72.

Next, if need be, the recessed areas 74 are filled with objects and/or other particles.

In this respect, the objects may be of different kinds, depending on the desired applications. Preferentially, each object (not shown) has a large dimension greater than 0.2 cm and the less than or equal to L1, i.e. close to 30 cm. the thickness is comprised between about ten micrometers and several tens of millimeters.

Certain types of objects such as solar cells, microbatteries and organic components have a simple shape of a square, a rectangle or further a disk, with a small thickness, and a surface area of the order of 0.1 to 100 $cm^2$.

These components may include pads or tapered plugs on the face in contact with the liquid for proceeding with their connections. Other types of objects, for example aiming at the detection of elements, at generating energy or further at transport of information, may have complex shapes, for example curved or spiral portions.

Moreover, the ratio between the large dimension of the particles 4 and that of the objects accommodated in the recessed areas of the film 4' is preferentially comprised between $10^4$ and $10^8$. Indeed, the large dimension of the particles is for example the order of 1 nm to 500 µm, while the objects may have a large dimension ranging up to about 30 cm.

the table below lists a few preferred examples for these objects.

| Nature | Dimensions | Field of application |
|---|---|---|
| Polyethylene terephthalate (PET) with a structured gold layer at the surface | PET: $3 \times 4$ cm$^2$; thickness 250 µm; PET: $1.5 \times 0.9$ cm$^2$; thickness 250 µm, Au: thickness 30 nm | Electronique organique |
| Glass with a photovoltaic cell at the surface | $25 \times 25$ mm$^2$; thickness 1.08 mm | Photovoltaic cell |
| Silicon chip | $3 \times 3$ cm$^2$; thickness 500 µm $1 \times 1$ cm$^2$; thickness 500 µm | Electronics |
| Micro-battery on silicon | $1 \times 1$ cm$^2$; thickness 500 µm | Energy storage |
| Bi-metal blade metal material (e.g.: zinc/copper) | $3.5 \times 2$ cm$^2$; thickness 140 µm; $5 \times 1.6$ cm$^2$; thickness 200 µm $7 \times 1.6$ cm$^2$; thickness 200 µm | Thermics, sensors |

Figure 9:
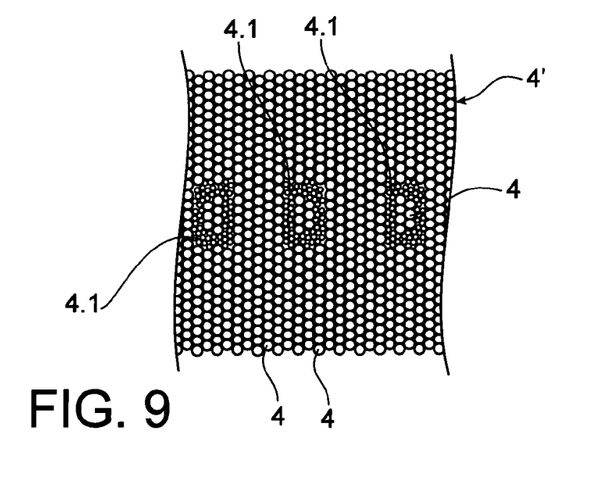

Alternatively, the recessed areas 74 are filled with other particles 4.1, as schematized in FIG. 9, similar to the particles 4 but of different composition and/or size, preferably injected there is so as to be in turn ordered in the filled inner areas. These injections may be achieved according to any suitable way known to one skilled in the art, for example with a micro-spray, with a nozzle, with an ink jet, or further with a conveyor.

The conveyor solution, for example of the ribbon type or with a succession of rollers, is also preferentially retained in the case of integration of objects into the recessed areas, for example in order to form hybrid devices. In addition to the conveyor solution, the setting into place of these objects may be achieved by means of conventional manipulation or grasping tools adapted to the nature, the shape and the dimension of the objects, like pliers.

Here again, it is noted that the setting into position of the objects/other particles 4.1 is preferentially carried out by stopping the running motion of the substrate as well as the flow of particles from the ramp 12, although this may be otherwise, without departing from the scope of the invention.

Possible applications for the method which has just been described were mentioned above. Practical examples are also described below.

This may be the manufacturing of the photovoltaic cells or of components of the LED/PLED/OLED type. Recent studies have shown that structuration of the interfaces in the field of photovoltaic, LED, PLED, OLED components, may provide a significant gain in yield or in emitted light. Within this framework, the compact films of particles are for example used as masking elements during steps for structuring the interfaces. The structurations are generally made through interstices present between the particles by depositions of materials or by plasma etching. Nevertheless, certain areas of the substrate have to be recessed for leaving clear the electric contact areas for example or simply because they do not have any particular function. With the method described above, it is therefore possible to define with the substance, on the liquid, the areas which should then be cleared of particles, and then to remove this substance after depositing the film onto the substrate.

Another example relates to heat exchangers. Structuration of the walls of the exchangers is a means for regulating heat exchanges. These structurations may be made by lithography with a mask of particles. With the method described above, by applying heterogeneous depositions associating particles of different dimensions, it is possible to obtain geometries usually made by lithography, and notably with geometries having particle size gradients.

Still another example relates to chemical sensors. The method described above provides the possibility of associating heterogeneous compact films with particles of different natures, and therefore allowing detection of different kinds of gases, chemicals species, etc.

Finally, in tribology, for mechanical applications, compact films may be used as a lithography mask for generating micro/nanotanks allowing retention of the lubricant at the surface of the objects being rubbed. The adjustment of the dimensions of these retention micro/nanotanks is a parameter for adjusting the friction coefficient. A simple means for changing the dimensions of these micro/nanotanks is to use as an etching mask, a heterogeneous compact film consisting of different sizes of particles, easy to obtain with the method specific to the present invention.

Of course, diverse modifications may be made by one skilled in the art to the invention which has just been described, only as non-limiting examples.

The invention claimed is:

1. A method for depositing particles onto a substrate, or a running substrate, comprising:
   (a) making a compact film of particles floating on a carrier liquid provided in a transfer area having an outlet of particles laid out facing the substrate;
   (b) depositing a substance onto the compact film of particles, in the transfer area;
   (c) transferring, through the outlet of particles and onto the substrate, the compact film of particles coated with the substance; and then
   (d) removing the substance to have the substance carry away the particles of the film which adhere to the substance, to generate at least one recessed area within the film deposited on the substrate.

2. The method according to claim 1, wherein the substance is deposited to define at least one pattern, or a point or a cord.

3. The method according to claim 1, wherein in each recessed area, at least one object or other particles are placed subsequently.

4. The method according to claim 3, wherein each object is taken from a group of silicon chips, micro-batteries, components of organic electronics, metal elements, photovoltaic cells, battery cells, and micro-battery cells.

5. The method according to claim 1, wherein the substance comprises a polymerizable compound, which is polymerized after its deposition on the compact film of particles.

6. The method according to claim 1, wherein the substance appears as a liquid or a slurry.

7. The method according to claim 1, wherein the substance has hydrophobicity.

8. The method according to claim 1, wherein the substance is based on a silicone resin, epoxy resin, and/or polyurethane resin.

9. The method according to claim 1, applying a tilted ramp for circulation of particles, attached to an inlet of the transfer area, and on which the carrier liquid can also circulate.

\* \* \* \* \*